UNITED STATES PATENT OFFICE.

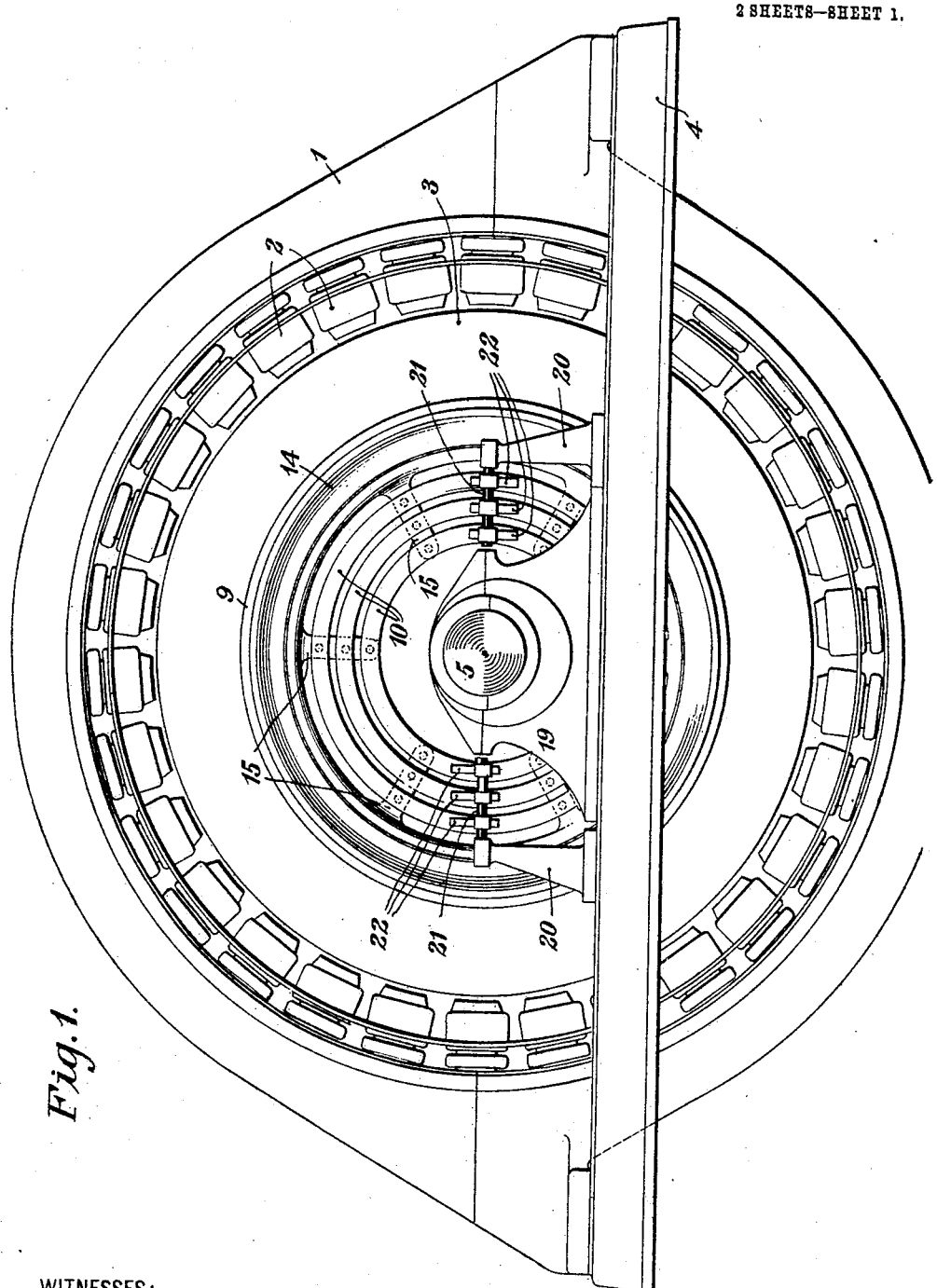

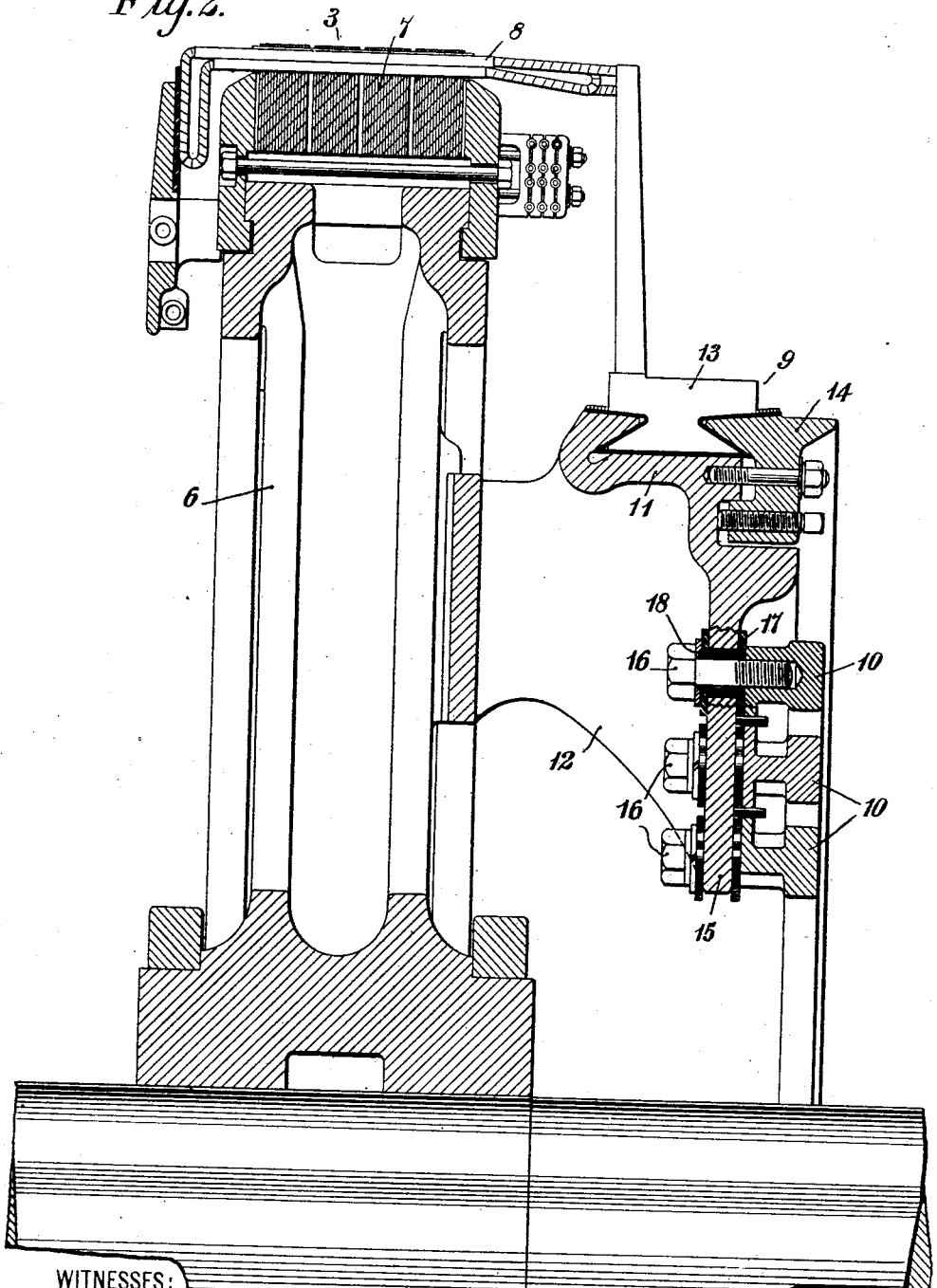

FRED C. HALL, OF WILKINSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

969,472.      Specification of Letters Patent.      Patented Sept. 6, 1910.

Application filed December 14, 1908. Serial No. 467,468.

*To all whom it may concern:*

Be it known that I, FRED C. HALL, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo-electric machines, and it has special reference to double-current machines which are provided with both commutators and collector rings.

The object of my invention is to provide an improved structure for machines of the class above indicated that shall be specially simple and durable and economical of space.

According to my present invention, I provide a plurality of collector rings which are concentrically arranged and are disposed within the cylindrical bushing on which the commutator segments are mounted. This arrangement is obviously adaptable to double-current generators or rotary converters of large size having commutator cylinders of large diameters.

Figure 1 of the accompanying drawings is an end elevation of a dynamo-electric machine constructed in accordance with my invention and Fig. 2 is a longitudinal section, on a larger scale, of the rotatable member of the machine shown in Fig. 1.

Referring to the drawings, the machine here illustrated comprises a stationary frame 1, having a plurality of polar projections 2, a rotatable member 3 and a bed plate or supporting structure 4. The rotatable member 3 comprises a shaft 5, a spider 6, a magnetizable core 7, a winding 8 therefor, a commutator cylinder 9 and a plurality of collector rings 10. The commutator cylinder 9 comprises a bushing 11, which is supported upon the spider 6 by means of arms 12, a plurality of commutator segments 13 and a clamping ring 14. The arms 12 are provided with extensions 15, the outer surfaces of which are finished into a single plane that is perpendicular to the axis of the machine, and the rings 10 are secured to these extensions by means of bolts 16 and are insulated from them by insulating washers 17 and bushings 18, in the usual manner.

The bed plate 4 is provided with blocks 19, in which the shaft bearings are supported, and brush holder brackets 20 from which insulated rods 21 project radially inward, brushes 22 being mounted upon the rods. The rods 21 are parallel to the plane of the collector rings 10, so that the brushes 22 engage the outer surfaces of the rings.

Attention is called to the fact that substantially the same amount of space is occupied by a rotary converter or double current generator, constructed as above indicated, as is occupied by a direct current machine of the same capacity, from which it will be apparent that the advantages over similar machines of the prior art are considerable.

I claim as my invention:

1. A rotatable member for double-current machines comprising a core member, a supporting spider having a plurality of laterally projecting arms, a commutator cylinder and a plurality of concentric collector rings supported on said arms.

2. In a dynamo-electric machine, the combination with a commutator cylinder, of a plurality of concentric collector rings disposed within the commutator cylinder.

3. In a dynamo-electric machine, the combination with a commutator cylinder, a sleeve or supporting bushing therefor having inwardly extending radial arms and a plurality of concentric collector rings secured to, and insulated from, said arms.

4. In a dynamo-electric machine, the combination with a commutator cylinder, of a plurality of concentric collector rings disposed within said cylinder.

5. In a dynamo-electric machine, the combination with a commutator cylinder, of a plurality of collector rings supported within said cylinder and having their contact faces perpendicular to the axis of the machine.

In testimony whereof, I have hereunto subscribed my name this 27th day of November, 1908.

FRED C. HALL.

Witnesses:
   T. B. HUMPHRIES,
   BIRNEY HINES.